Patented Oct. 21, 1952

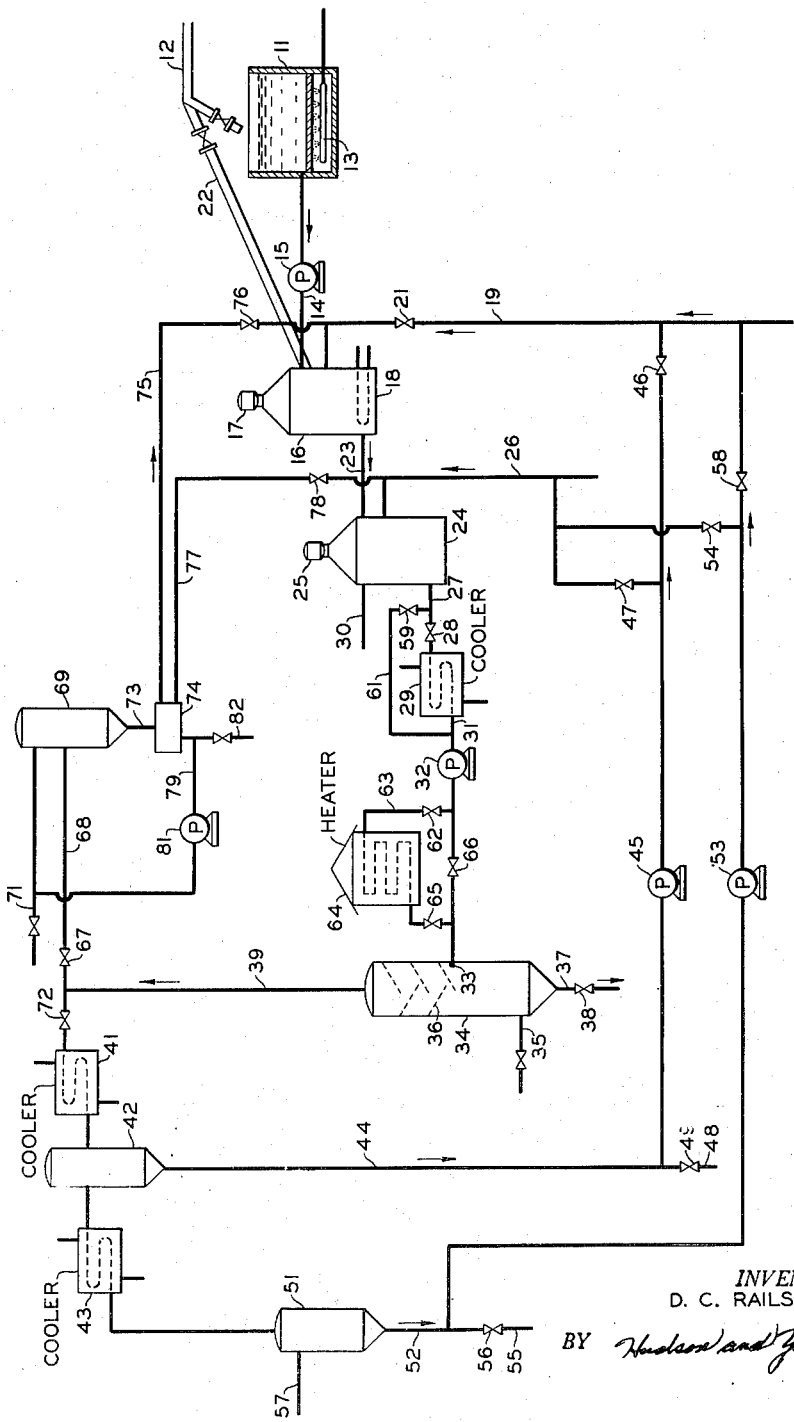

2,614,908

UNITED STATES PATENT OFFICE 2,614,908

PROCESS FOR PRODUCING FINELY DIVIDED SULFUR

Darrell C. Railsback, Phillips, Tex., assignor to Phillips Petroleum Company, a corporation of Delaware Application July 11, 1949, Serial No. 104,024

13 Claims. (Cl. 23—224)

This invention relates to a method of processing sulphur. In one of its more specific aspects it relates to a method of producing finely divided sulphur. In another of its more specific aspects it relates to a method of producing finely divided sulphur from an emulsion.

Sulphur has long been used in various manufacturing and industrial processes. In many industries it is quite desirable to utilize the sulphur in a finely divided form. Conventional processes which have been devised for the production of finely divided sulphur are relatively expensive. An example of one of the conventional expensive methods of producing finely divided sulphur is the production of flowers of sulphur which is a batch process. It is well known that batch operation is more expensive than continuous processes. Finely divided sulphur is also produced by grinding or milling solidified masses of sulphur. That type of operation requires expensive machinery and considerable power consumption.

Broadly speaking, this invention comprises the emulsification of a hot, water immiscible hydrocarbon solution of sulphur in water so as to divide the dissolved sulphur into small separated portions. The sulphur in the small portions of divided solvent are solidified into finely divided particles. The water and hydrocarbon are then removed from around the finely divided sulphur material. Production of finely divided sulphur in this manner may be carried on very economically as compared to conventional methods of producing finely divided sulphur.

An object of this invention is to provide a method for producing finely divided sulphur. Another object of this invention is to produce finely divided sulphur from an emulsion stage. Another object of this invention is to provide a low temperature process for the production of finely divided sulphur. Another object of this invention is to provide a method for producing finely divided amorphous sulphur. Another object of the invention is to produce an economical method for producing sulphur. Other and further objects and advantages will be apparent to one skilled in the art upon study of the accompanying disclosure.

A better understanding of the invention will be obtained upon reference to the accompanying drawing which is a diagrammatic plan view of an apparatus and flow plan of this invention.

Referring particularly to the drawing, tank 11 is provided so as to receive crude sulphur from conveyor conduit 12 which communicates between tank 11 and a sulphur supply source, not shown. A heater 13 is provided adjacent the lower portion of tank 11 and provides heat for the purpose of melting the crude sulphur in tank 11. The molten sulphur is removed from tank 11 by means of conduit 14 which has pump 15 positioned therein for the purpose of supplying the necessary motivation to move the molten sulphur from tank 11 to tank 16. Tank 16 is provided with an agitator 17 and with heating coils 18. Any conventional hot heat exchange medium can be utilized for the purpose of supplying heat to tank 16 through coils 18 in an indirect heat exchange. Conduit 19 communicates between a hydrocarbon supply source, not shown, and tank 16. Valve 21 is provided in line 19 so as to control or stop flow therethrough. A hydrocarbon fraction, such as a petroleum or coal tar hydrocarbon material, is preferably supplied to tank 16 through conduit 19 in a heated condition. The temperature of the heated hydrocarbon material is usually about the temperature of the molten sulphur when the sulphur material which is supplied to tank 16 is in a molten state.

In one modification of the invention, the crude sulphur from the sulphur supply source, not shown, is supplied in a crushed condition directly to tank 16 through sulphur supply conduit 22. The hydrocarbon material which is supplied to tank 16 is in this case also preferably maintained in a heated condition.

Sulphur which is supplied to tank 16 through conduits 14 or 22 is mixed with the heated hydrocarbon material in tank 16, preferably by means of agitation provided by agitator 17 so as to dissolve the sulphur material in the heated hydrocarbon. The sulphur-containing hydrocarbon material within tank 16 is maintained in a liquid condition at a temperature above the melting point of sulphur, preferably at a temperature of at least 240° F. while maintaining the hydrocarbon material in a liquid state.

The heated sulphur-containing hydrocarbon material is passed from tank 16 through conduit 23 into tank 24. Tank 24 is provided with an agitator 25. Water which has preferably been heated to about the melting point of sulphur and which is maintained in a liquid state is supplied to tank 24 through conduit 26 which extends between a water supply source and tank 24. The water and sulphur-containing hydrocarbon material are mixed by the vigorous agitation of agitator 25 so as to form a hydrocarbon in water emulsion. In such an emulsion the water material forms an outer phase about an inner hydrocarbon phase, which inner phase comprises the sulphur-containing hydrocarbon material. This emulsification is a highly important feature of this invention, for it is by this step that the subsequent growth of large sulphur crystals is substantially prevented. The emulsification of the hydrocarbon material in water is greatly accelerated by the addition of up to 2 volume per cent of emulsion accelerators, such as dodecylamine hydrochloride, rosin soaps, or sulfonates, through conduit 30. The solubility of the sulphur in hydrocarbon is increased by the addition of between 15 and 35 volume per cent ditertiary disulfides ranging from $C_4$'s to $C_{16}$'s to the mixture. The disulfides may be added to tank 16 through line 19. Fine dispersion of the sulphur-containing hydrocarbon material in water greatly reduces the possibility for the growth of large sulphur crystals upon cooling of the sulphur-containing hydrocarbon.

In one concept of the invention, the emulsion of hydrocarbon material in water is passed through conduit 27 and valve 28 through cooler 29 positioned therein so as to cool the emulsion to a temperature below the solidification point of the sulphur. In this manner, the sulphur is solidified as finely divided particles within the hydrocarbon in water emulsion. The solubility of sulphur in the cold hydrocarbon material is much less than in the heated hydrocarbon. The solid sulphur is thus not materially dissolved by the hydrocarbon in the cooled emulsion. The amount of sulphur which is contained within each droplet of hydrocarbon material, which is in turn encompassed by an outer phase of water, is very small. The resulting solid sulphur particles which are formed during the cooling are thus quite small. The cooled emulsion, at a temperature below about 230° F., is passed from cooler 29 by means of conduit 31 through pump 32 positioned therein, through an injector 33, and into vaporizer 34 wherein the solid sulphur particles are separated from the hydrocarbon water emulsion by the flow of partial pressure gas, such as air or steam, which is injected at inlet 35 in the lower portion of vaporizer 34 and passes upwardly through the vaporizer. Separation of the vaporous material from the finely divided solid sulphur material is ordinarily better accomplished when the emulsion which is passed through pump 32 is placed under a pressure of at least 100 p. s. i. and preferably under a pressure of at least 150 p. s. i. Baffle members 36 are provided in the upper portion of vaporizer 34 and baffle the flow of gaseous materials upwardly through the vaporizer so as to aid in the separation of the solid sulphur material from the vapors. The finely divided sulphur material is removed from the lower portion of vaporizer 34 through outlet conduit 37 and valve member 38. The gaseous materials are removed from the upper portion of vaporizer 34 through outlet conduit 39 and are passed through cooler 41 in which the temperature of the effluent material is lowered to such a point that either the hydrocarbon material or a water-rich material is condensed, depending upon their condensation points. The cooled effluent stream is passed from cooler 41 to dropout chamber 42 in which the condensed material is removed from the gaseous material of the effluent stream. The remaining gaseous material of the effluent stream is passed through a second cooler 43 wherein the condensable vapors are condensed. The hydrocarbon fraction stream which is separated as one phase of the condensed effluent material is recycled to tank 16 as a portion of the hydrocarbon solvent. Whether the hydrocarbon phase or the water-rich phase is condensed first will depend upon the boiling point of the hydrocarbon material being used as the solvent in the system. If a portion of the hydrocarbon material boils above the boiling point of water, the hydrocarbon phase will be removed first in dropout chamber 42. In such a case, the hydrocarbon material will be removed from dropout chamber 42 through conduit 44, pump 45, and valve 46. In case the water-rich phase is removed first in dropout chamber 42, valve 46 is closed and the water-rich stream is passed through conduit 44, pump 45, and valve 47 into tank 24. Any excess water or water-rich phase material is removed through conduit 48 and valve 49. The entire water-rich phase can be discarded if desired.

The above described process is in some instances modified by maintaining the vaporizer under reduced pressure rather than utilizing a partial pressure gas to aid in the separation of finely divided sulphur, water, and hydrocarbon materials.

In case the hydrocarbon phase is removed first in dropout chamber 42, the water-rich phase may be passed through separator 51, conduit 52, pump 53, and valve 54 to tank 24. Any excess water or water-rich phase material may be removed from the system through conduit 55 and valve 56. Any non-condensable material is removed from separator 51 through outlet conduit 57. In case the water-rich phase is removed in dropout chamber 42, the hydrocarbon phase is recycled to tank 16 through conduit 52, pump 53, and valve 58, while valve 54 is closed.

In another modification of the invention, the heated sulphur-containing hydrocarbon material water emulsion is passed from tank 24 through conduit 27, valve 59, and conduit 61 so as to bypass cooler 29, valve 28 being closed. The material is placed under pressure as above described by pump 32 in conduit 31 and is passed through valve 62, conduit 63, heater 64, and valve 65 to injector 33, valve 66 being closed. In this modification the heated sulphur-containing material is maintained at a temperature substantially close to the evaporation point of the hydrocarbon solvent and the water. When the sulphur-containing material is injected into vaporizer 34, the hydrocarbon and water are flash evaporated so as to shock cool the sulphur material to form the finely divided sulphur particles which are contained within the droplets of the emulsion. In this modification no partial pressure gas is utilized, instead vaporizer 34 is maintained under a partial vacuum. The finely divided sulphur material is removed from the lower portion of vaporizer 34 through outlet conduit 37 and valve 38. The vaporous materials are removed from the upper portion of vaporizer 34 through conduit 39. The vapors are passed through valve 67 and conduit 68 into a barometric condenser 69 intermediate its ends. Water material is supplied to a point above the injection of vaporous materials in condenser 69 through conduit 71. The water material contacts the vaporous materials directly, causing the materials to be condensed, thus reducing the volume of material within condenser 69 and applying the partial vacuum to vaporizer chamber 34, valve 72 being closed. The condensed materials, together with the water quench, are removed from the lower portion of condenser 69 through conduit 73 and are passed into a separator 74 wherein water and hydrocarbon phases are separately formed. The hydrocarbon phase is withdrawn from the upper portion of separator 74 through conduit 75 and is passed through valve 76 into the downstream end of conduit 19 and thus into chamber 16, valve 21 being closed or partially closed so as to regulate the inflow of fresh hydrocarbon to tank 16. A portion of the water phase is removed from separator 74 through conduit 77 and is passed through valve 78 into the downstream end of conduit 26, and thence into chamber 24. A portion of the water phase may be passed from separator 74 through conduit 79 and pump 81 to conduit 71 for re-injection into condenser 69. Any excess water may be discarded from separator 74 through conduit 82.

The petroleum fraction which is used as the sulphur solvent in this process boils within the range of between 90° F. and 390° F. at atmospheric pressure. It is necessary to maintain the evaporator under a vacuum of about 29 inches of mercury when utilizing a solvent having a boiling point of 390° F. Under such a vacuum the solvent is evaporated at a temperature below the melting point of the sulphur. A petroleum fraction which boils within the range of 100° F. and 300° F. is preferred for the best operation of the process and it is also preferred that the petroleum fraction be a hydrocarbon aromatic-rich fraction. Chlorinated hydrocarbon fractions boiling within the above boiling range also operate very successfully in the process of this invention. The concentration of the sulphur and droplet size of the sulphur-containing hydrocarbon in the emulsion can be regulated by means of temperature and degree of agitation of the sulphur-containing petroleum fraction in the emulsion. Finely divided emulsion particle size is favored by increasing the intensity of agitation in tank 24 and to a lesser degree by higher temperature. As the amount of sulphur in each droplet is reduced as a result of the droplet size of said emulsion the opportunity for the growth of sulphur crystals is also greatly reduced.

The finely divided sulphur which is ordinarily formed by the process of this invention in which the sulphur containing petroleum fraction is heated to a temperature of between 240° F. and 650° F. in mixer 16 is the monoclinic type sulphur which is soluble in carbon disulfide. The process of this invention may, however, be utilized so as to form finely divided sulphur in the amorphous state, the amorphous sulphur being insoluble in carbon disulfide. It is necessary in the formation of the amorphous sulphur that the sulphur and petroleum fraction be heated to a temperature above 660° F., but preferably not above 800° F. The liquid petroleum fraction must contain sufficient sulphur in such a process as to be in a saturated state within the above high temperature range. When such conditions are met the sulphur material is shock cooled from a temperature within the latter boiling range and will form solid amorphous particles which are insoluble in carbon disulfide.

Insoluble sulphur tends to revert to a soluble form at low storage temperatures. Such reversion is greatly increased when the sulphur material is contacted with water before it solidifies. By the process of this invention, the sulphur is dissolved in the hydrocarbon material and is thus kept from contact with the water material until after solidification of the sulphur. Reversion of the insoluble form of sulphur to the soluble form is greatly retarded by contacting the sulphur with a halogen or a halogen providing material. The halogens which are suitably utilized for the stabilization step are chlorine and bromine. The chlorine and bromine tend to remove small amounts of water from the sulphur and in that manner slow the reversion of the insoluble material. Ordinarily, it is not necessary to utilize over one per cent by weight of a halogen in contact with the sulphur particles to accomplish the stabilization. Amorphous sulphur particles which are removed from the vaporizer 34 through conduit 37 may be contacted with a halogen or halogen providing material in a chamber, not shown, for the purpose of stabilizing the amorphous sulphur particles.

Other and further modifications of this invention will be apparent to those skilled in the art upon study of this disclosure. Such modifications are believed to be within the spirit and the scope of the disclosure of this invention.

I claim:

1. A process for the production of finely divided sulphur which comprises the steps of dissolving sulphur in a hydrocarbon fraction in a liquid state at a temperature of at least 240° F.; forming an emulsion of said sulphur-containing hydrocarbon fraction in water; placing said emulsion under pressure; injecting said emulsion into a vaporization zone under vaporizing conditions, whereby said hydrocarbon and water are vaporized, a separate sulphur particle is formed from each individual droplet of said emulsion as the result of said vaporization and said hydrocarbon and water vapors are separated from resulting finely divided solid sulphur; and recovering said finely divided sulphur.

2. The process of claim 1, wherein an emulsion accelerator selected from the group consisting of dodecylamine hydrochloride, rosin soaps, and sulfonates is mixed with said hydrocarbon fraction and said sulphur in an amount up to 2 volume per cent based upon said hydrocarbon.

3. The process of claim 1, wherein ditertiary disulfides within the range of from $C_4$ to $C_{16}$ are mixed with said hydrocarbon fraction and said sulphur in an amount of between 15 and 35 volume per cent based upon said hydrocarbon.

4. A process for the production of finely divided sulphur which comprises the steps of dissolving sulphur in a liquid hydrocarbon fraction in a mixing zone at a temperature of between 660° F. and 800° F.; forming an emulsion of said sulphur-containing hydrocarbon in water at a temperature of between 660° F. and 800° F.; flashing said emulsion into a vaporization zone under vaporizing conditions, whereby said hydrocarbon and water are vaporized, said sulphur is solidified as finely divided particles from individual droplets of said emulsion as the result of said vaporization, and said hydrocarbon and water vapors are separated from resulting finely divided solid sulphur; contacting the finely divided sulphur with a halogen selected from the group consisting of chlorine and bromine; and recovering said finely divided sulphur.

5. A process for the production of finely divided sulphur which comprises the steps of dissolving sulphur in a liquid hydrocarbon fraction in a mixing zone at a temperature of at least 240° F.; forming an emulsion of said sulphur-containing hydrocarbon fraction in water; injecting said emulsion into a vaporization zone under vaporizing conditions so as to vaporize said hydrocarbon and water, solidify finely divided sulphur as the result of said vaporization and to separate said finely divided solid sulphur from said water and hydrocarbon vapors; removing and recovering said finely divided solid sulphur material from the bottom portion of said vaporization zone; removing effluent material from the upper portion of said vaporization zone; separating hydrocarbon materials from said effluent materials; and recycling said hydrocarbons as a liquid fraction to said mixing zone.

6. A process for the production of finely divided sulphur which comprises the steps of dissolving molten sulphur in a liquid hydrocarbon fraction, which boils in the range of between 90° F. and 390° F., in a mixing zone at a temperature between 240° F. and 800° F.; forming an emulsion of said sulphur-containing hydrocarbon in water; cooling said emulsion so as to solidify said sulphur in said emulsion as finely divided particles; injecting said emulsion into a vaporization zone and into the presence of a stream of partial pressure gas under vaporizing conditions so as to vaporize said hydrocarbon and water and separate said finely divided solid sulphur from said water and hydrocarbon vapors; removing said finely divided solid sulphur material from the bottom portion of said vaporization zone; removing effluent material from the upper portion of said vaporization zone; separating hydrocarbon materials from said effluent material; and recycling said hydrocarbons as a liquid fraction to said mixing zone.

7. A process for the production of finely divided sulphur which comprises the steps of dissolving crushed sulphur in a liquid hydrocarbon fraction, which boils in the range of between 90° F. and 390° F., in a mixing zone at a temperature between 240° F. and 800° F.; forming an emulsion of said sulphur-containing hydrocarbon in water; flashing said emulsion into a vaporization zone under vaporizing conditions, whereby said hydrocarbon and water are vaporized and said sulphur is solidified as finely divided particles from individual droplets of said emulsion as the result of said vaporization; removing said finely divided solid sulphur material from the upper portion of said vaporization zone; removing effluent material from the upper portion of said vaporization zone; separating hydrocarbon materials from said effluent material; and recycling said hydrocarbons as a liquid fraction to said mixing zone.

8. A process for the production of finely divided sulphur which comprises the steps of dissolving sulphur in a liquid hydrocarbon fraction in a mixing zone at a temperature of between 660° F. and 800° F. so as to saturate said hydrocarbon; agitating said sulphur-saturated hydrocarbon with liquid water at a temperature between 660° F. and 800° F. in an emulsification zone so as to form a fine hydrocarbon in water emulsion; injecting said emulsion into a vaporization zone under vaporizing conditions, whereby said water and hydrocarbon materials are vaporized and said sulphur is shock cooled as the result of said vaporization so as to solidify said sulphur as finely divided particles from individual droplets of said emulsion; removing said finely divided solid sulphur material from the lower portion of said vaporization zone; removing effluent material from the upper portion of said vaporization zone; separating hydrocarbon materials from said effluent material; and recycling said hydrocarbons as a liquid fraction to said mixing zone.

9. A process for the production of finely divided sulphur which comprises the steps of heating sulphur to a molten state; heating a hydrocarbon fraction which boils within the range between 100° F. and 300° F. to at least the melting point of said sulphur while maintaining said hydrocarbon material in a liquid state; mixing said molten sulphur and said heated liquid hydrocarbon so as to dissolve said sulphur in said hydrocarbon; forming an emulsion of said sulphur-containing hydrocarbon in water in an emulsifying zone; shock cooling said emulsion so as to solidify said sulphur as finely divided particles; placing said emulsion under a pressure of at least 100 p. s. i.; injecting said emulsion into a vaporization zone under reduced pressure so as to separate said finely divided sulphur from said water and hydrocarbon materials; removing said finely divided solid sulphur material from the bottom portion of said vaporization zone; separating hydrocarbon material from said effluent material; and recycling said separated hydrocarbon material as a liquid fraction to said mixing zone.

10. The process of claim 9; wherein a water-rich phase is formed from said effluent materials which remain after the separation of hydrocarbon materials therefrom; and recycling said water-rich phase to said emulsifying zone.

11. The process of claim 9, wherein the materials in said sulphur-hydrocarbon mixture are heated to a temperature between 240° F. and 650° F.

12. The process of claim 9, wherein the materials in said sulphur-hydrocarbon mixture are heated to a temperature between 660° F. and 800° F.

13. A process for the production of finely divided sulphur which comprises the steps of heating sulphur to a molten state; heating an aromatic-rich hydrocarbon fraction which boils within the range of between 100° F. and 300° F. to at least the melting point of said sulphur while maintaining said hydrocarbon material in a liquid state; mixing said molten sulphur and said heated liquid hydrocarbon so as to dissolve said sulphur in said hydrocarbon; agitating said sulphur-containing hydrocarbon in the presence of water in an emulsification zone so as to form a hydrocarbon in water emulsion; cooling said emulsion so as to solidify said sulphur as finely divided particles; placing said emulsion under a pressure of at least 150 p. s. i.; flashing said emulsion into a vaporization zone under reduced pressure so as to separate said finely divided sulphur from said water and hydrocarbon materials; removing said finely divided solid sulphur material from the bottom portion of said vaporization zone; and removing effluent material from the upper portion of said vaporization zone.

DARRELL C. RAILSBACK.

REFERENCES CITED

The following references are of record in the file of this patent:

UNITED STATES PATENTS

| Number | Name | Date |
|---|---|---|
| 1,705,862 | Hartzell | Mar. 19, 1929 |
| 2,343,860 | Bencowitz | Mar. 14, 1934 |
| 2,119,125 | Anthony | May 31, 1938 |
| 2,348,736 | Heath | May 16, 1944 |

FOREIGN PATENTS

| Number | Country | Date |
|---|---|---|
| 561,370 | Great Britain | May 17, 1944 |